(12) United States Patent
Kung

(10) Patent No.: US 9,075,586 B2
(45) Date of Patent: Jul. 7, 2015

(54) POWER SWITCHING SYSTEM, COMPUTER SYSTEM, AND REBOOT CONTROLLING METHOD THEREOF

(75) Inventor: Chih-Chain Kung, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 441 days.

(21) Appl. No.: 13/457,212

(22) Filed: Apr. 26, 2012

(65) Prior Publication Data
US 2013/0031345 A1 Jan. 31, 2013

(30) Foreign Application Priority Data
Jul. 29, 2011 (TW) .............................. 100127077 A

(51) Int. Cl.
*G06F 1/26* (2006.01)
*G06F 1/24* (2006.01)

(52) U.S. Cl.
CPC ... *G06F 1/26* (2013.01); *G06F 1/24* (2013.01)

(58) Field of Classification Search
None
See application file for complete search history.

(56) References Cited

U.S. PATENT DOCUMENTS

| | | | | |
|---|---|---|---|---|
| 5,742,514 | A * | 4/1998 | Bonola | 700/286 |
| 7,774,633 | B1 * | 8/2010 | Harrenstien et al. | 713/323 |
| 2011/0087910 | A1 * | 4/2011 | Lambert et al. | 713/323 |

OTHER PUBLICATIONS

Chinese Office Action dated Aug. 27, 2014, as issued in corresponding China Patent Application No. 201110232170.9 (with English translation of pp. 3-5 as marked in the Office Action—13 pages).

* cited by examiner

*Primary Examiner* — Paul Yanchus, III
(74) *Attorney, Agent, or Firm* — Muncy, Geissler, Olds & Lowe, P.C.

(57) ABSTRACT

A power switching system, a computer system, and a reboot controlling method thereof are disclosed. The power switching system is used to the computer system and includes a first power input port, a first power output port, a first linear regulator module, and a first switch module. The first power input port is used for inputting a first power signal. The first power output port is used for outputting a second power signal. The first linear regulator module includes a first transformer unit used for transforming the first power signal into the second power signal, and a first switch control unit used for controlling the first transformer unit. When the first switch module is activated, the first switch control unit is connected to a ground and controls the first transformer unit to stop outputting the second power signal.

15 Claims, 3 Drawing Sheets

POWER SWITCHING SYSTEM, COMPUTER SYSTEM, AND REBOOT CONTROLLING METHOD THEREOF

BACKGROUND OF THE INVENTION

1. Field of the Invention

The present invention relates to a power switching system, a computer system and a reboot controlling method thereof; more particularly, the present invention relates to a power switching system, a computer system and a reboot controlling method applied in the system capable of easily removing a power signal.

2. Description of the Related Art

With the development of science and technology, types and styles of modern electronic products become increasingly diverse. Meanwhile, modern electronic products are designed to be compact. Therefore, currently a thin tablet type computer system has been developed. However, in known prior arts, in order to keep the structure of a conventional tablet computer in a compact size, its battery is usually built-in and non-pluggable. Consequently, if the software or hardware structure of the tablet computer has a serious problem which results in malfunction, the user is unable to perform global reset by removing the power source to try to solve the problem. The user has to send the tablet computer to a professional maintenance center, at where a maintenance technician could disassemble the casing of the tablet computer to remove the battery. The user cannot perform a simple trouble shooting task to the tablet computer, which is very time-consuming and labor-intensive to the user; meanwhile, the maintenance cost of the maintenance technician would be increased as well.

Therefore, there is a need to provide a novel power switching system, a computer system and a reboot controlling method thereof, such that the user can easily remove the power supply of the computer system to perform a simple trouble-shooting task, so as to mitigate and/or obviate the aforementioned problems.

SUMMARY OF THE INVENTION

It is an object of the present invention to provide a power switching system, which is capable of easily removing a power signal.

It is another object of the present invention to provide a computer system utilizing the power switching system.

It is yet another object of the present invention to provide a reboot controlling method used in the system.

To achieve the abovementioned objects, the power switching system of the present invention is used in a computer system. The computer system comprises a power supply module. The power switching system comprises a first power input port, a first power output port, a first linear regulator module and a first switch module. The first power input port is electrically connected to the power supply module, and is used for inputting a first power signal. The first power output port is used for outputting a second power signal. The first linear regulator module includes a first transformer unit and a first switching control unit. The first transformer unit is electrically connected to the first power input port and the first power output port, and is used for transforming the first power signal into the second power signal. The first switching control unit is electrically connected to the first transformer unit, and is used for controlling the first transformer unit. The first switch module is electrically connected to the first switching control unit, the first power input port and a ground end, wherein when the first switch module is activated, the first switching control unit is connected to the ground end, so as to further control the first transformer unit to stop outputting the second power signal.

The computer system of the present invention comprises a power supply module, a control module and a power switching system. The power switching system is electrically connected to the power supply module and the control module. The power switching system comprises a first power input port, a first power output port, a first linear regulator module and a first switch module. The first power input port is electrically connected to the power supply module, and is used for inputting a first power signal. The first power output port is used for outputting a second power signal. The first linear regulator module includes a first transformer unit and a first switching control unit. The first transformer unit is electrically connected to the first power input port and the first power output port, and is used for transforming the first power signal into the second power signal. The first switching control unit is electrically connected to the first transformer unit, and is used for controlling the first transformer unit. The first switch module is electrically connected to the first switching control unit, the first power input port and a ground end, wherein when the first switch module is activated, the first switching control unit is connected to the ground end, so as to further control the first transformer unit to stop outputting the second power signal.

The reboot controlling method of the present invention comprises the following steps: receiving a power signal for transmitting to a control module; stopping transmitting the power signal to the control module; executing a booting process to resume receiving the power signal; determining whether to stop transmitting the power signal to the control module by activating the first switch module; if no, executing a first rebooting process; and if yes, executing a second rebooting process.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
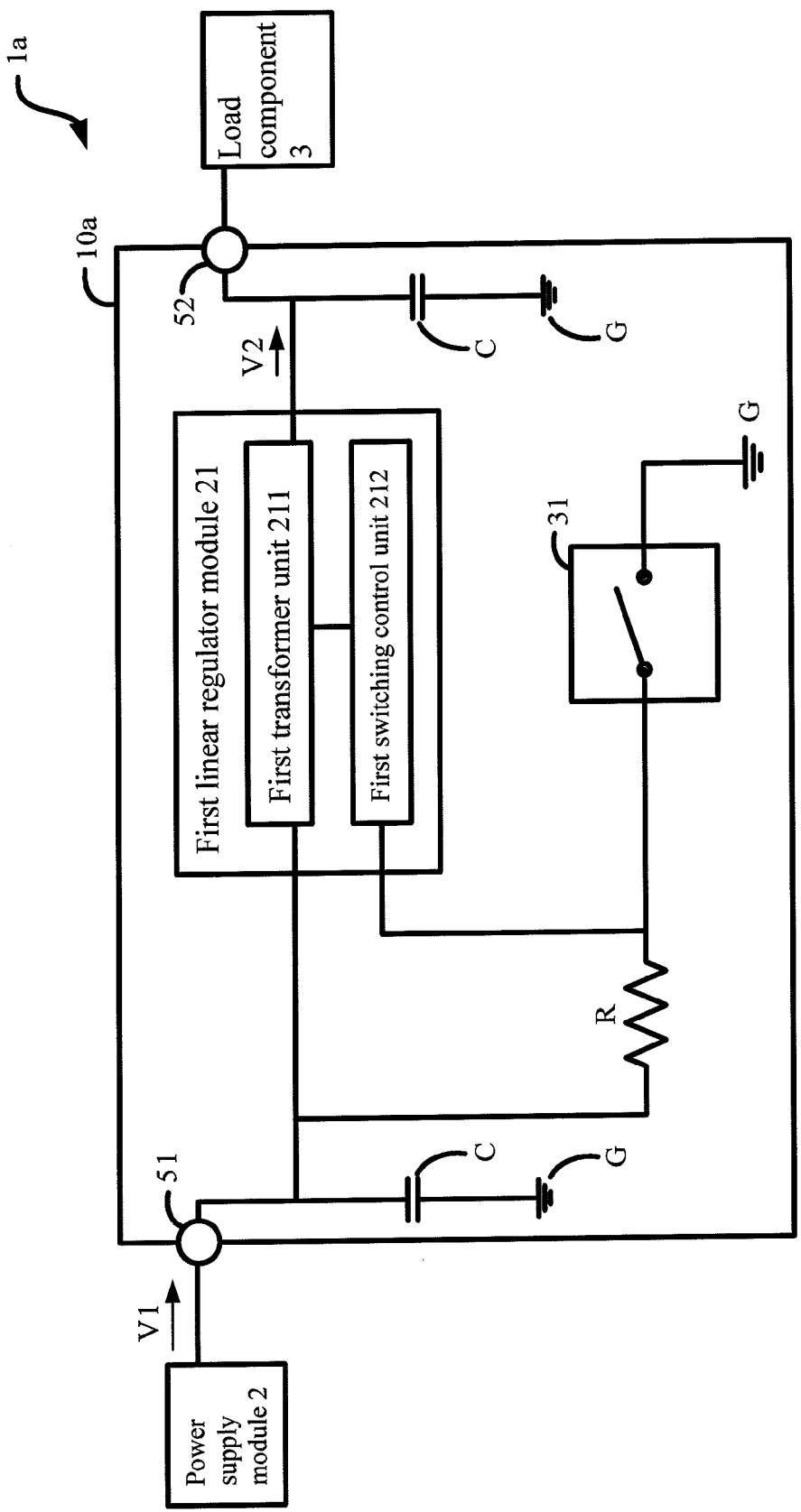
FIG. 1 illustrates a circuit architecture chart of a computer system and a power switching system according to a first embodiment of the present invention.

Please refer to FIG. 1, which illustrates a circuit architecture chart of a computer system and a power switching system according to a first embodiment of the present invention.

In the first embodiment of the present invention, a power switching system 10a is used in a computer system 1a. The computer system 1a can be, but not limited to, a tablet computer, a smart phone or other equivalent electronic product. The computer system 1a comprises a power supply module 2 and a load component 3. The power supply module 2 can be a battery module or an external power supply device, used for supplying a power signal for being used by the computer system 1a. The load component 3 is an element in the computer system 1a that can be activated by receiving the power signal. The power signal of the power supply module 2 has to be transformed by the power switching system 10a before being transmitted to the load component 3 for the load component 3 to use.

The power switching system 10a comprises a first linear regulator module 21, a first switch module 31, a first power input port 51, a first power output port 52 and other passive components such as a capacitance C or a resistance R. The first power input port 51 is electrically connected to the power supply module 2, and is used for receiving a first power signal V1 from the power supply module 2. In the first embodiment of the present invention, the first power signal V1 is, but not limited to, a 5V signal.

The first linear regulator module 21 includes a first transformer unit 211 and a first switching control unit 212. The first transformer unit 211 is electrically connected to the first power input port 51 and the first power output port 52, and is used for receiving the first power signal V1, as well as for transforming the first power signal V1 into a second power signal V2 for being used by the load component 3. Then, the second power signal V2 is outputted to the load component 3 via the first power output port 52. In the first embodiment of the present invention, the second power signal V2 is, but not limited to, a 3.3V signal.

The first switching control unit 212 is electrically connected to the first transformer unit 211, and is used for controlling the first transformer unit 211, so as to further determine whether to continue outputting the second power signal V2. The first switch module 31 is electrically connected to the first linear regulator module 21, the first power input port 51, and a ground end G. The first switch module 31 is used for controlling the first switching control unit 212 of the first linear regulator module 21, so as to determine whether to continue or stop outputting the second power signal V2 to the load component 3.

When the first switch module 31 is activated, the first switching control unit 212 is electrically connected to the ground end G, such that the potential of the first switching control unit 212 would drop to zero. The first switching control unit 212 further controls the first transformer unit 211 to stop outputting the second power signal V2 to the load component 3. The activation of the first switch module 31 can be achieved by means of pressing a button or adjusting a knob, but the scope of the present invention is not limited to the above description. As a result, because the load component 3 cannot constantly receive the second power signal V2, the user can fully discharge the load component 3 in the computer system 1a by means of utilizing the activation of the first switch module 31, thereby accomplishing the object of global reset.

Please note that the first power input port 51 and the first power output port 52 can also be electrically connected to the capacitance C for the use of voltage stabilization. Meanwhile, the power switching system 10a can be installed with other passive components, such as the resistance R. Please note the scope of the present invention is not limited to the circuit architecture as shown in FIG. 1. Because the design of adding passive components to the circuit layout has been widely applied by those skilled in the related art, and is not the key feature of the present invention, there is no need to further describe its principle.

Figure 2:
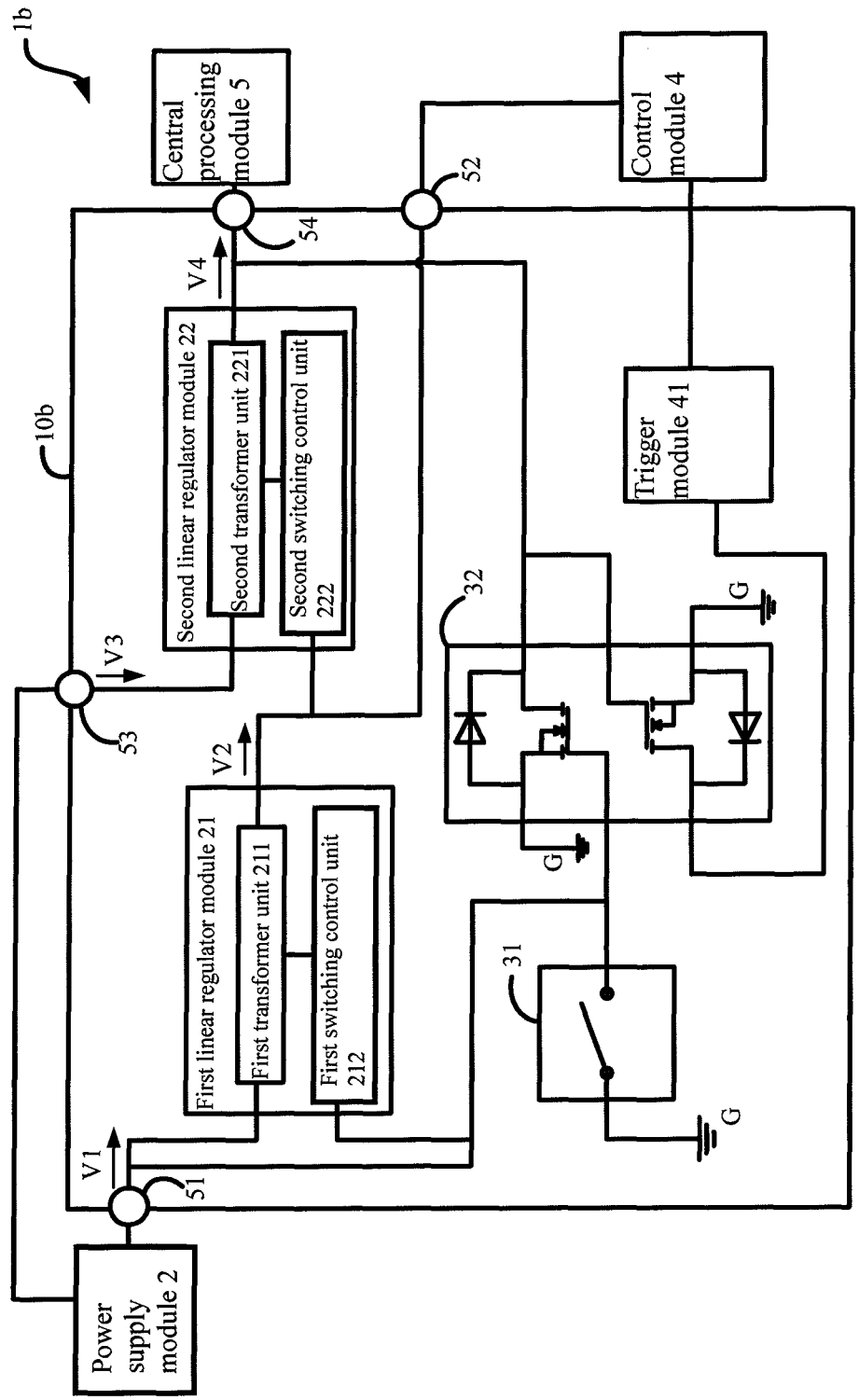
FIG. 2 illustrates a circuit architecture chart of the computer system and the power switching system according to a second embodiment of the present invention.

Then, please refer to FIG. 2, which illustrates a circuit architecture chart of the computer system and the power switching system according to a second embodiment of the present invention.

In the second embodiment of the present invention, the computer system 1b comprises a power supply module 2, a control module 4, a central processing module 5 and a power switching system 10b. The power supply module 2 is electrically connected to the first power input port 51 and a second power input port 53, and is used for supplying a first power signal V1 and a third power signal V3 respectively to each component in the computer system 1b. In the present invention, please note that the first power signal V1 and the third power signal V3 are not required to be the power signals with the same or different voltages and currents. Meanwhile, in the present invention, the first power signal V1 and the third power signal V3 are not limited to be directly outputted by the power supply module 2. That is, after a power signal is outputted by the power supply module 2, the power signal would then become the first power signal V1 or the third power signal V3 after voltage transformation.

Both the control module 4 and the central processing module 5 can be formed by, but not limited to, hardware or the combination of hardware and firmware. The control module 4 can be a keyboard controller used for managing a booting process and other processes of the computer system 1b. The central processing module 5 is used for managing primary process flows of the computer system 1b. Because the control module 4 and the central processing module 5 are well-known to those skilled in the art, and have been widely applied to related electronic devices, there is no need to further describe the functions of the control module 4 and the central processing module 5.

The power switching system 10b is electrically connected to the power supply module 2, the control module 4 and the central processing module 5, and is used for controlling whether to transmit the power signal generated by the power supply module 2 to the control module 4 and the central processing module 5. The power switching system 10b comprises a first linear regulator module 21, a second linear regulator module 22, a first switch module 31, a second switch module 32, a trigger module 41, a first power input port 51, a first power output port 52, a second power input port 53 and a second power output port 54.

The first power input port 51 and the second power input port 53 are directly or indirectly electrically connected to the power supply module 2, and are used for respectively inputting the first power signal V1 and the third power signal V3. The first power input port 51 is electrically connected to a first transformer unit 211 of the first linear regulator module 21, so as to receive the first power signal V1, and to transform the first power signal V1 into the second power signal V2 for the control module 4 to use. Finally, the second power signal V2 is transmitted to the control module 4 via the first power output port 52.

A first switching control unit 212 of the first linear regulator module 21 is used for controlling the first transformer unit 211. The first switching control unit 212 determines whether to continue or stop outputting the second power signal V2 to the control module 4 according to whether the first switch module 31 is activated. Therefore, the user can fully discharge the control module 4 in the computer system 1b by means of utilizing the activation of the first switch module 31, thereby accomplishing the object of global reset.

Because the first linear regulator module 21 and the first switch module 31 act the same as what described in the first embodiment of the present invention, there is no need for further description.

The second linear regulator module 22 comprises a second transformer unit 221 and a second switching control unit 222. The second transformer unit 221 is electrically connected to the second switching control unit 222. Similar to the first linear regulator module 21, the second transformer unit 221 of the second linear regulator module 22 is electrically connected to the second power input port 53, and is used for receiving the third power signal V3, as well as for transforming the third power signal V3 into a fourth power signal V4 for being outputted to the central processing module 5 via the second power output port 54. The second switching control unit 222 is electrically connected to the first power output port 52. When the first power module 31 is activated, the first transformer unit 211 would not output the second power signal V2, such that the potential of the second switching control unit 222 would drop to zero. As a result, the second switching control unit 222 can control the second transformer unit 221 to stop outputting the fourth power signal V4 to the central processing module 5, so as to completely cut the power of the central processing module 5, thereby accomplishing the object of global reset. Meanwhile, after the power of the central processing module 5 is cut off, the power of the control module 4 would be cut off for unable to receive the second power signal V2.

The second switch module 32 is electrically connected to the first switch module 31, and can simultaneously receive the first power signal V1 from the first power input port 51 and the fourth power signal V4 generated by the second transformer unit 221. In FIG. 2, the second switch module 32 comprises, but not limited to, a dual metal oxide semiconductor field effect transistor (MOSFET). When the first switch module 31 is activated, the second switch module 32 would generate a switch signal for being transmitted to the trigger module 41. For example, when the first switch module 31 is activated, the second switch module 32 would not receive the first power signal V1 and the fourth power signal V4; therefore, according to the activation of the dual metal oxide semiconductor field effect transistor in the second switch module 32, a "high-low-high" potential change signal would be generated, wherein the "high-low-high" potential change signal is the switch signal generated by the second switch module 32. The above mentioned internal activation of the second switch module 32 is just an example without limiting the scope of the present invention.

The trigger module 41 is electrically connected to the second switch module 32 and the control module 4. When the second switch module 32 transmits the switch signal to the trigger module 4, the trigger module 4 would generate a trigger signal, such as a "low-to-high" trigger signal, according to the switch signal. Finally, the trigger signal would be transmitted to a specific pin of the control module 4. As a result, when the computer system 1b reboots and resumes the power supply, the control module 4 would firstly check whether the trigger signal is received. If the trigger signal is received, the reason for the power cut of the computer system 1b would be interpreted as the first switch module 31 being activated, and a related processing procedure can be performed accordingly.

Figure 3:
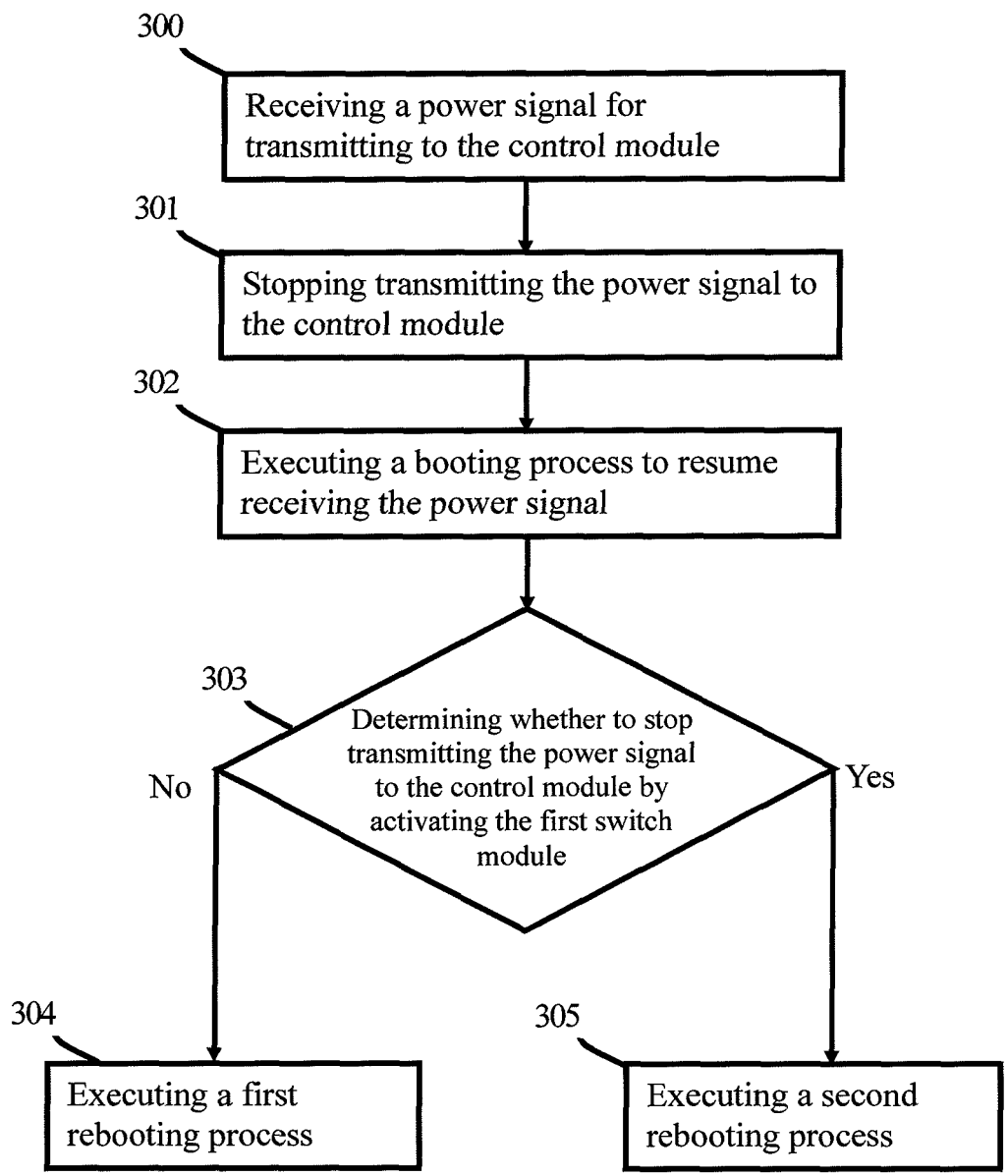
FIG. 3 illustrates a flowchart of a computer system reboot controlling method according to the present invention.

Then, please refer to FIG. 3, which illustrates a flowchart of a computer system reboot controlling method according to the present invention. In the following embodiment, the computer system 1b having the power switching system 10b is used as an example for describing the computer system reboot controlling method of the present invention, but please note the scope of the reboot controlling method of the present invention is not limited to using the computer system 1b having the power switching system 10b.

First, the method performs step 300: receiving a power signal for transmitting to the control module.

At first, each electronic component, such as the control module 4 and the central processing module 5, in the computer system 1b receives the power signal from the power supply module 2, and transmits it to the control module 4. That is, after the power supply module 2 provides the first power signal V1, the second power signal V2 is transmitted to the control module 4 via the first transformer unit 211. Further, the power supply module 2 can also provide the third power signal V3, such that the fourth power signal V4 can be transmitted to the central processing module 5 via the second transformer unit 221.

Then, the method performs step 301: stop transmitting the power signal to the control module.

Then, each electronic component, such as the control module 4 and the central processing module 5, in the computer system 1b stops receiving the power signal from the power supply module 2. That is, the control module 4 and the central processing module 5 cannot receive the second power signal V2 or the fourth power signal V4. Next, the method performs step 302: executing a booting process to resume receiving the power signal.

Next, the computer system 1b reboots so as to let the computer system 1b execute the booting process. The power supply module 2 resumes the power supply, so as to transmit the power signal to the computer system 1b. That is, the control module 4 and the central processing module 5 can receive the second power signal V2 and the fourth power signal V4 again.

Then, the method performs step 303: determining whether to stop transmitting the power signal to the control module by activating the first switch module.

Then, after the resumption of the power supply, the computer system 1b would automatically check the reason of stopping receiving the power signal by determining whether the situation of stopping transmitting the second power signal V2 to the control module 4 is caused by activating the first switch module 31. That is, in step 301, if the user controls the first switch module 31 to force the computer system 1b to perform global reset, the second switch module 32 would generate the switch signal, such that the trigger module 41 would then generate the trigger signal according to the switch signal. As a result, in step 303, the computer system 1b would perform the determination based on determining whether the control module 4 receives the trigger signal. Because the method of generating the trigger signal by the computer switching system 10 has been previously described in detail, there is no need for further explanation.

If the control module 4 does not receive the trigger signal, it is confirmed that the user does not force the computer system 1b to perform global reset by activating the first switch module 31. Under such circumstances, the reason that the power supply module 2 fails to normally provide the power signal might be caused by low battery/power of the power supply module 2.

Therefore, after the power supply module 2 resumes the normal power supply, the method performs step 304: executing a first rebooting process.

When the natural shutdown occurs because the power supply module 2 fails to normally provide the power signal, the software programs or hardware modules of the computer system 1b are not damaged. Therefore, the computer system 1b operates normally, the control module 4 would execute the first rebooting process to the computer system 1b, wherein the first rebooting process is a normal process to reboot the computer system 1b.

If the control module 4 receives the trigger signal, it is confirmed that the user forces the computer system 1b to perform global reset by activating the first switch module 31. Under such circumstances, the computer system 1b might possibly encounter abnormal operation or failure, and that is why the global reset is required.

As a result, when the second power signal V2 is re-outputted to the control module 4, the method performs step 305: executing a second rebooting process.

The control module 4 firstly executes a second rebooting process to the computer system 1b, wherein the second rebooting process is a special process to reboot the computer system 1b. For example, the second rebooting process can comprise executing an inspection process, so as to fully inspect the states of the software programs and the states of the hardware modules in the computer system 1b; or, the control module 4 can perform detailed inspection to at least one software program or at least one hardware module in the computer system 1b according to a predetermined configuration; however, please note the scope of the present invention is not limited to the above description.

Please note that the computer system reboot controlling method of the present invention is not limited to the abovementioned steps orders. The abovementioned step orders can be reordered as long as the object of the present invention can be achieved.

According to the above description, the user can conveniently utilize the abovementioned power switching system 10a or 10b to perform global reset to the computer system 1a or 1b without completely removing the power supply module 2 of the computer system 1a or 1b. Further, the computer system 1a or 1b can execute different inspection processes according to different rebooting conditions as well.

Although the present invention has been explained in relation to its preferred embodiments, it is to be understood that many other possible modifications and variations can be made without departing from the spirit and scope of the invention as hereinafter claimed.

What is claimed is:

1. A power switching system used in a computer system and electrically connected to a control module, the computer system including a power supply module, the power switching system comprising:
   a first power input port, electrically connected to the power supply module, used for inputting a first power signal;
   a first power output port, used for outputting a second power signal;
   a first linear regulator module, comprising:
      a first transformer unit, electrically connected to the first power input port and the first power output port, used for transforming the first power signal into the second power signal; and
      a first switching control unit, electrically connected to the first transformer unit, used for controlling the first transformer unit;
   a first switch module, electrically connected to the first switching control unit, the first power input port and a ground end, wherein when the first switch module is activated, the first switching control unit is electrically connected to the ground end, so as to control the first transformer unit to stop outputting the second power signal for forcing the computer system to be discharged to perform global reset;
   a second switch module, electrically connected to the first switch module, used for generating a switch signal when the first switch module is activated; and
   a trigger module, electrically connected to the second switch module, used for generating a trigger signal according to the switch signal;
   wherein the first power output port and the trigger module are electrically connected to the control module, and the first power output port is used for transmitting the second power signal to the control module, and for transmitting the trigger signal to the control module when the first switch module is activated.

2. The power switching system as claimed in claim 1, further comprising:
   a second power input port, electrically connected to the power supply module, used for inputting a third power signal;
   a second power output port, used for outputting a fourth power signal; and
   a second linear regulator module, including:
      a second transformer unit, electrically connected to the second power input port and the second power output port, used for transforming the third power signal into the fourth power signal; and
      a second switching control unit, electrically connected to the second transformer unit and the first power output port, used for controlling the second transformer unit according to the second power signal, so as to determine whether to continue or stop outputting the fourth power signal.

3. The power switching system as claimed in claim 2, wherein the fourth power signal is transmitted to a central processing module.

4. The power switching system as claimed in claim 1, wherein the second switch module comprises a dual metal oxide semiconductor field effect transistor (MOSFET).

5. The power switching system as claimed in claim 1, wherein the first switch module controls the first switching control unit by way of pressing.

6. A computer system comprising:
   a power supply module;
   a control module; and
   a power switching system, electrically connected to the power supply module and the control module, the power switching system comprising:
      a first power input port, electrically connected to the power supply module, used for inputting a first power signal;
      a first power output port, used for outputting a second power signal to the control module;
      a first linear regulator module, including:
         a first transformer unit, electrically connected to the first power input port and the first power output port, used for transforming the first power signal into the second power signal; and
         a first switching control unit, electrically connected to the first transformer unit, used for controlling the first transformer unit;
      a first switch module, electrically connected to the first switching control unit, the first power input port and a ground end, wherein when the first switch module is activated, the first switching control unit is electrically connected to the ground end, so as to control the first transformer unit to stop outputting the second power signal for forcing the control module to be discharged to perform global reset;

a second switch module, electrically connected to the first switch module, used for generating a switch signal when the first switch module is activated; and a trigger module, electrically connected to the second switch module, used for generating a trigger signal according to the switch signal;

wherein the control module is electrically connected to the trigger module for receiving the trigger signal.

7. The computer system as claimed in claim 6, wherein the power switching system further comprises:

a second power input port, electrically connected to the power supply module, used for inputting a third power signal;

a second power output port, used for outputting a fourth power signal; and a second linear regulator module, including:
   a second transformer unit, electrically connected to the second power input port and the second power output port, used for transforming the third power signal into the fourth power signal; and
   a second switching control unit, electrically connected to the second transformer unit and the first power output port, used for controlling the second transformer unit according to the second power signal, so as to determine whether to continue or stop outputting the fourth power signal.

8. The computer system as claimed in claim 7, wherein the fourth power signal is transmitted to a central processing module.

9. The computer system as claimed in claim 6, wherein the second switch module comprises a dual metal oxide semiconductor field effect transistor (MOSFET).

10. The computer system as claimed in claim 6, wherein the control module is a keyboard controller.

11. The computer system as claimed in claim 6, wherein the first switch module controls the first switching control unit by way of pressing.

12. A computer system reboot controlling method used in a computer system, the computer system comprising a power switching system and a control module, wherein the power switching system further comprises a first switch module, a second switch module and a trigger module, the method comprising the following steps:

receiving a power signal for transmitting to the control module;

stopping transmitting the power signal to the control module;

executing a booting process to resume receiving the power signal;

determining whether to stop transmitting the power signal to the control module for forcing the control module to be discharged to perform global reset by activating the first switch module;

if no, executing a first rebooting process; and if yes, executing a second rebooting process;

wherein the step of stopping transmitting the power signal to the control module further comprises:
   stopping transmitting the power signal and generating a switch signal through the second switch module when the first switch module is activated; and
   generating a trigger signal through the trigger module according to the switch signal;
and
the step of determining whether to stop transmitting the power signal to the control module by activating the first switch module further comprises:
   determining whether to receive the trigger signal through the control module.

13. The computer system reboot controlling method as claimed in claim 12, wherein the step of executing the second rebooting process comprises:

executing a checking routine to the computer system.

14. The computer system reboot controlling method as claimed in claim 13, wherein the step of executing the checking routine comprises:

checking statuses of a software program and a hardware module inside the computer system.

15. The computer system reboot controlling method as claimed in claim 13, wherein the step of executing the checking routine comprises:

checking a status of at least one software program or at least one hardware module inside the computer system.

* * * * *